March 19, 1968   L. L. KIELMAN   3,374,482
RADAR DISH IN PLASTIC CASEMENT
Filed Sept. 30, 1958   2 Sheets-Sheet 1
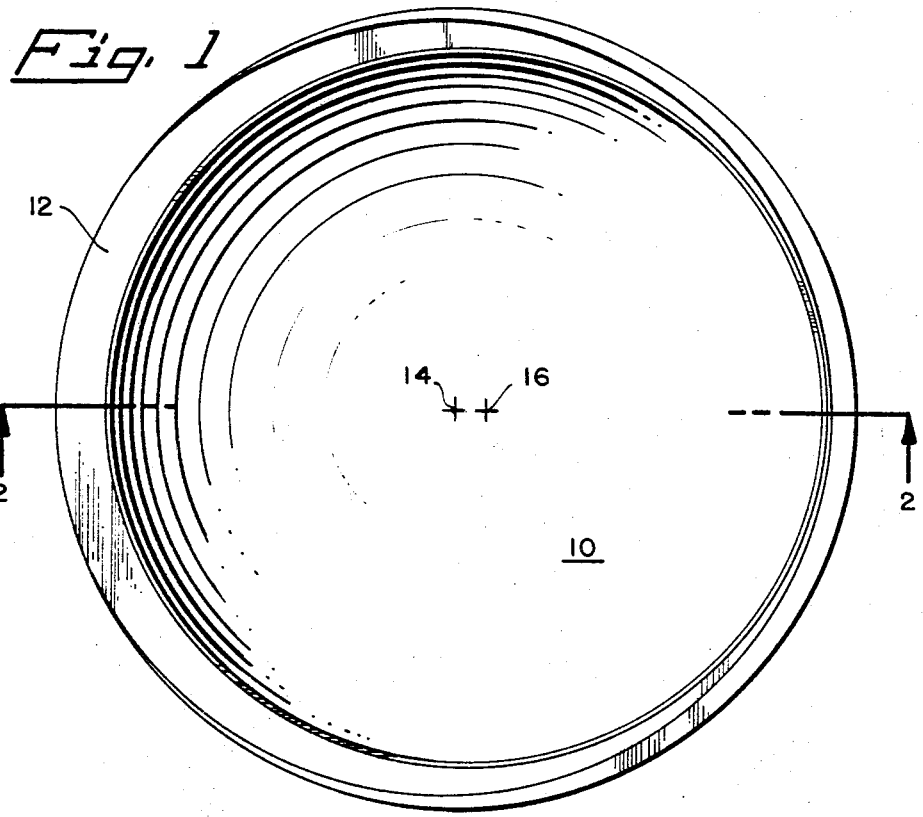
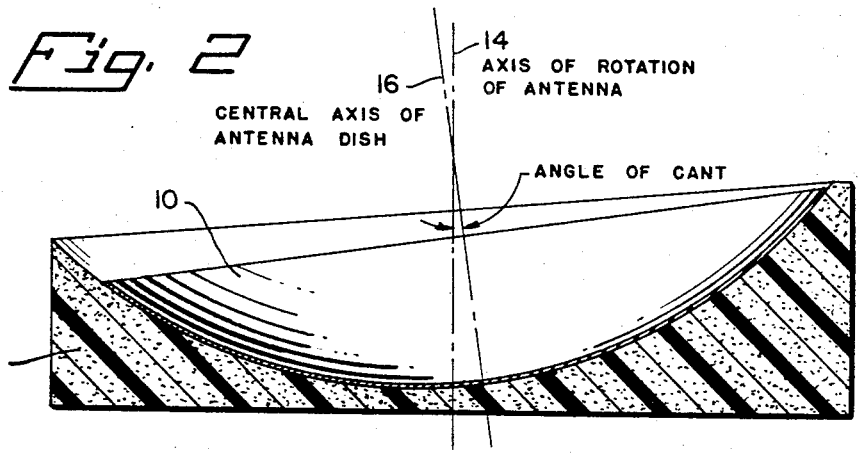
INVENTOR.
LEO L. KIELMAN
BY
J. M. St. Amand
ATTORNEYS.

March 19, 1968 L. L. KIELMAN 3,374,482
RADAR DISH IN PLASTIC CASEMENT
Filed Sept. 30, 1958 2 Sheets-Sheet 2

INVENTOR.
LEO L. KIELMAN
BY
*J. M. St. Amand*
ATTORNEYS.

United States Patent Office 3,374,482
Patented Mar. 19, 1968

3,374,482
RADAR DISH IN PLASTIC CASEMENT
Leo L. Kielman, China Lake, Calif., assignor to the United States of America as represented by the Secretary of the Navy
Filed Sept. 30, 1958, Ser. No. 764,456
5 Claims. (Cl. 343—761)

The invention described herein may be manufactured and used by or for the Government of the United States of America for governmental purposes without the payment of any royalties thereon or therefor.

The present invention relates to a radar antenna-dish and more particularly to a balanced high-speed rotating canted radar antenna-dish.

Conventional rotating canted radar-antenna dishes have an inherent mass unbalance and an air pumping action. Previous method for overcoming mass unbalance of a canted radar antenna-dish when rotated about its off-center spin-axis utilized counter weights and balancing rings to minimize the mass unbalance. However, counter weights and balancing rings had the disadvantage of adding excessive mass to the antenna-dish which in turn imposed excessive loads on the spin bearings. Further, the use of balancing rings and counter weights did not in any manner prevent the air pumping action of a canted antenna-dish while being rotated.

The present invention overcomes the disadvantages of prior methods and provides a means for eliminating or reducing to an acceptable minimum mass unbalance and completely eliminates air pumping action which are inherent in a conventional rotating canted radar antenna-dish. This improved rotated canted radar antenna-dish comprises an extremely thin metal antenna-dish imbedded within a concentric casement of foamed plastic to provide excellent balancing damping characteristics for smooth operation upon rotation of the antenna-dish.

It is an object of the invention, therefore, to provide a means for eliminating the mass unbalance of a rotating canted radar antenna-dish.

Another object of the invention is to provide an improved rotating canted radar antenna-dish in which air pumping action inherent in conventional rotating canted radar antenna-dishes is eliminated.

A further object of the invention is to provide a new and improved rotating canted radar antenna-dish enclosed in a casement of plastic and having substantially no mass unbalance and air pumping action.

A still further object of the invention is to provide a very light weight and strong radar antenna-dish which is simple to assemble.

Other objects and many of the attendant advantages of this invention will be readily appreciated as the same becomes better understood by reference to the following detailed description when considered in connection with the accompanying drawings wherein:

FIG. 1 is a plan-view of a portion of the canted radar antenna-dish assembly of the present invention;

FIG. 2 is a cross-sectional view taken along the line 2—2 of FIG. 1;

Referring now to the drawings, like numerals refer to like parts in each of the views.

Figure 3:
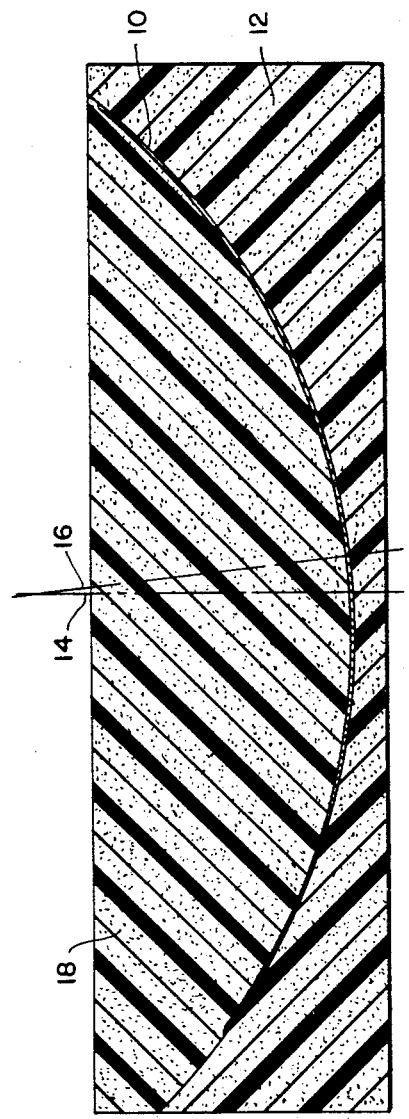
FIG. 3 is a cross-sectional view, as in FIG. 2, of a complete antenna-dish assembly showing the canted antenna-dish completely encased in plastic.

A portion of one embodiment of the radar antenna-dish assembly of the present invention is shown in FIGS. 1 and 2. A spherical antenna-dish 10 having a metallized reflective surface has a disk portion 12 of plastic moulded about the bottom side thereof. The metallized spherical surface or dish 10, for example, may be made of preformed aluminum foil or any other type of metallized reflective surfacing, and is formed or moulded (as shown in FIG. 2) in a canted position with respect to axis 14, the axis of rotation of disk portion 12. For example, the central perpendicular axis 16 of antenna-dish 10 may be positioned at a cant of 7 degrees off-center of the axis of rotation 14. Plastic 18 is then moulded about the top portion of dish 10 and disk portion 12, as illustrated in the cross-section shown in FIG. 3 so that plastic 12 and 18 completely encase antenna-dish 10 in plastic, forming a concentric antenna-dish assembly 20. The preferred type of plastics used for encasing the antenna-dish are those like diisocyanate foamed plastic, for example. Foamed plastic has very good vibration damping characteristics which produce smoother operation of the rotation mass. However, any light plastics compatible with radar energy may be used.

When using foamed-in place plastics, such as diisocyanate foamed plastic, the preformed antenna-dish 10 may be placed in a micarta mold, for example, held in the proper canted position; liquid resins mixed in their correct proportions and amounts are then poured into the mold and the mold quickly covered with a vented cap. The mixed resins will react exothermically and begin to expand, and the excess from the reaction will be released from the vent holes in the mold cap. The mold is allowed to cure for about two hours at a temperature of 150° F. After curing, the antenna assembly is released from the mold and the resultant product is a light weight antenna-dish held rigidly in plastic. The over-all contour of the plastic encased antenna-dish assembly is concentric with the rotating axis and the plastic foam is in no way detrimental to the reception of radar energy by the dish. The density of the foamed plastic, for example, is about 6 lbs. per cubic foot, and the over-all weight of the antenna-dish assembly is within good design weight limitations.

Another method that would be employed for encasing an antenna-dish in plastic would be to cast a foamed-in place plastic, for example, with the antenna-dish contour existing in the plastic. The antenna-dish contour in the plastic could then be metallized or metal sprayed with an extremely fine layer of metal, or a thin metal foil dish placed in position thereon. After the metallizing or positioning the metal foil dish, the dish contour could be filled with more plastic material to achieve the final concentric form.

Figure 4:
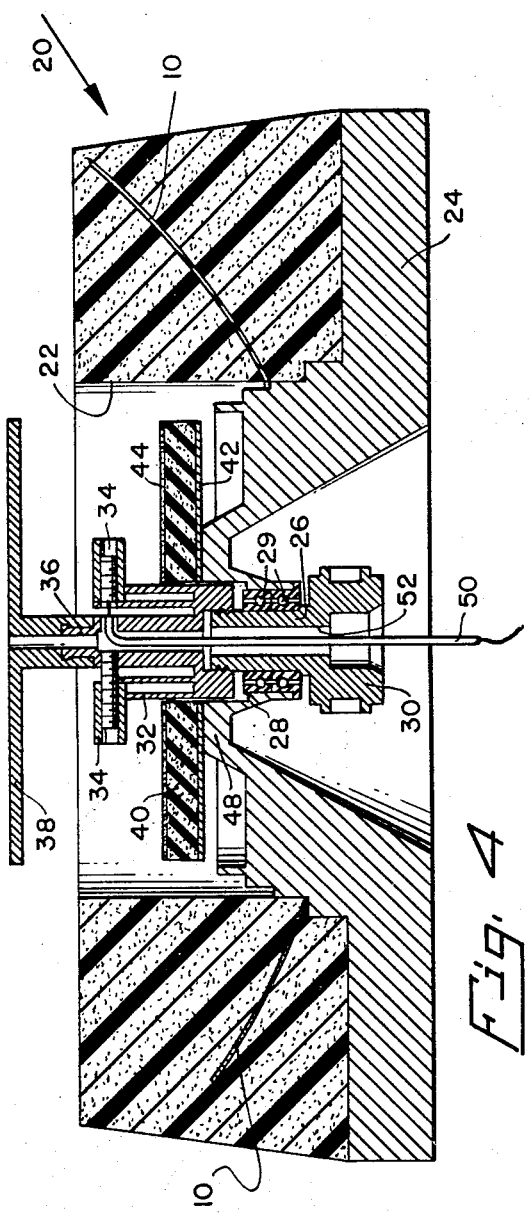
FIG. 4 is a cross-sectional view of an embodiment of a plastic encased antenna-dish of the present invention as used in a gyro-stabilized radar antenna wherein the canted antenna-dish rotates at high speed with the gyro rotor.

In FIG. 4 is illustrated a cross-sectional view of an embodiment of the plastic encased antenna-dish described. In this case the central portion of the antenna-dish assembly 20 has been cut out and adapted for use in a gyro stabilized radar antenna where the canted antenna-dish rotates with the gyro rotor.

Antenna-dish assembly 20, having a central aperture 22 therein is mounted with the bottom side thereof against the gyro rotor 24. The rotor 24 is rotatably mounted on shaft 26 at central skirt portion 28 by means of bearings 29. The lower end of shaft 26 has an inner gyro gimbal 30 thereon. The upper end has a Balun type dipole antenna 32 mounted thereon, with antenna sleeves 34 extending therefrom at right angles to the spin axis of rotation of the gyro rotor. Attached to the upper end 36 of dipole antenna 32 is a flat disk-shaped antenna reflector 38. Beneath the antenna sleeves 34 and reflector 38 is an absorbent disk 40, of material such as sponge rubber, for example, which operates to absorb spurious reflections. The lower side of absorbent disk 40 is covered with a thin layer of metal foil 42, and is covered on the upper side with a thin layer of carbon 44. Absorbent disk 40 is mounted on a raised central portion 48 of gyro rotor 24 and rotates therewith. Shielded electrical lead 50 passes through a passage 52 in shaft 26 and is connected to the dipole antenna sleeves. The dipole antenna 32 and reflector 38 mounted on shaft 26 do not rotate, but remain stationary with respect to the gyro spin axis, while rotor 24 and antenna-dish assembly 20 rotate together about the gyro spin axis.

As can be seen from the description and drawings, the present invention provides a rotating canted radar antenna-dish which completely eliminates air pumping action, reduces mass unbalance to a minimum, and materially increases the life of the spin bearings.

Obviously, many modifications and variations of the present invention are possible in the light of the above teachings. It is therefore to be understood that within the scope of the appended claims the invention may be practiced otherwise than as specifically described.

What is claimed is:

1. In a gyro mounted radar antenna, a gimbal-mounted support, a gyro rotor mounted on said support, said rotor operable to be rotated at high-speeds, an antenna-dish assembly having a large central aperture mounted on said gyro rotor, said antenna-dish assembly comprising a metallized spherical reflective surface imbedded at a cant within a concentric plastic casement, and operable to eliminate air pumping action due to cant of the spherical reflective surface and reduce mass unbalance, said antenna-dish assembly and rotor operable to rotate together about the gyro rotor spin axis, said gimbal-mounted support supporting a dipole type antenna and a flat radar energy reflector concentric with the aperture in said antenna-dish assembly.

2. The device of claim 1 wherein means for absorbing spurious radar energy reflections is mounted on said gyro rotor beneath said dipole type antenna and rotates with said rotor.

3. The device of claim 2 wherein said plastic casement is made of foamed plastic which is in no way detrimental to the reception of radar energy by said spherical reflective surface.

4. A gyro-radar antenna assembly comprising, a gimbal-mounted support, a gyro rotor rotatably mounted on said support, radar antenna means comprising a reflective surface imbedded at a cant within a radar compatible material casement, said gyro rotor and the casement of said radar antenna means being in facial contact and directly connected thereby providing a compact gyro rotating mass and radar antenna means operable to rotate together, said gyro rotor and radar antenna means together comprising the rotating mass of the gyro.

5. A gyro mounted radar antenna comprising a gimbal-mounted support, a gyro rotor mounted on said support, said rotor having an upper plane surface and operable to be rotated at high speeds, a radar antenna means comprising a metal spherical reflective surface imbedded within a solid cylindrical casement having upper and lower parallel plane surfaces formed at right angles to the axis of the cylindrical casement wherein the axis of the reflective surface is at a cant to the axis of the cylindrical casement, said cylindrical casement having a concentric cylindrical opening therethrough and through said reflective surface, said lower plane surface of said cylindrical casement in fixed facial contact with the upper plane surface of said rotor whereby said gyro rotor and radar antenna means together form a compact unit and comprise the rotating mass of the gyro.

References Cited

UNITED STATES PATENTS

| | | | |
|---|---|---|---|
| 2,964,266 | 12/1960 | Fuchs | 343—117 X |
| 2,666,199 | 1/1954 | Rothschild | 343—117 |
| 2,689,304 | 9/1954 | Lawrence | 343—912 X |

HERMAN KARL SAALBACH, *Primary Examiner.*

C. L. JUSTUS, *Examiner.*

R. E. BERGER, M. NUSSBAUM, *Assistant Examiners.*